(No Model.)
H. ILIOWIZI.
AIR MOISTENING ATTACHMENT FOR HOT AIR REGISTERS.
No. 526,923. Patented Oct. 2, 1894.
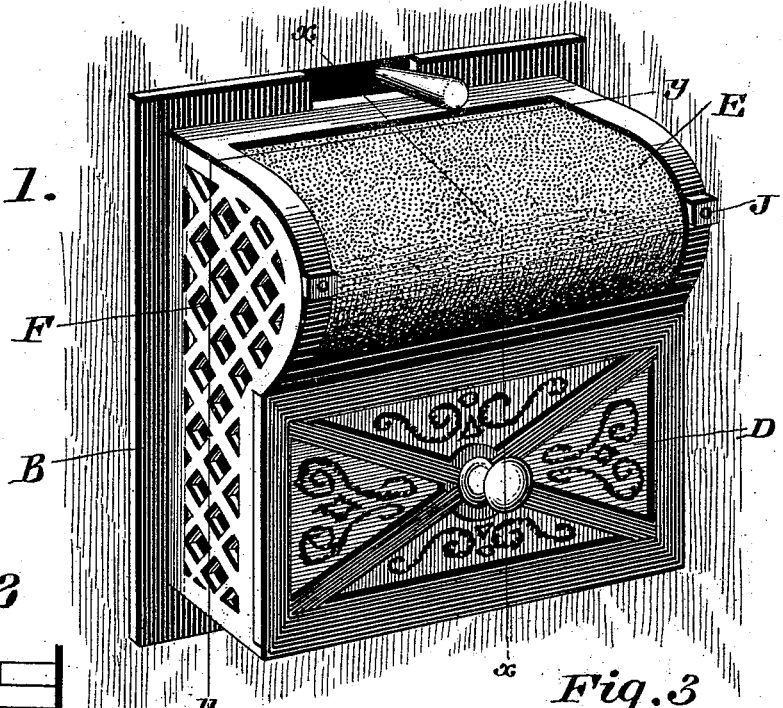
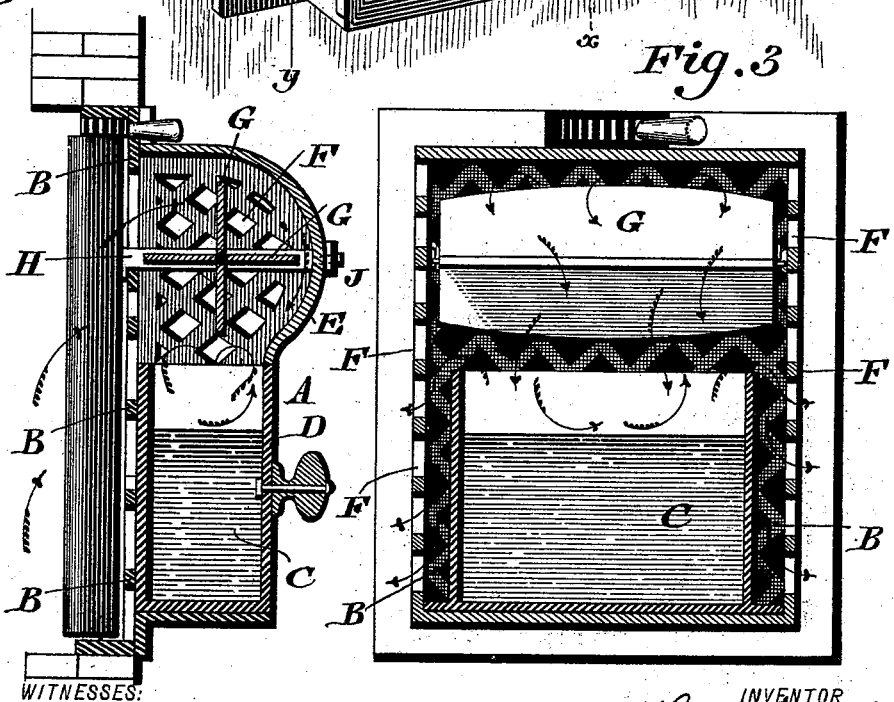
WITNESSES:
P. H. Chagle.
L. Douville.
INVENTOR
Henry Iliowizi
BY
John A. Biedersheim
ATTORNEY.

UNITED STATES PATENT OFFICE.

HENRY ILIOWIZI, OF PHILADELPHIA, PENNSYLVANIA.

AIR-MOISTENING ATTACHMENT FOR HOT-AIR REGISTERS.

SPECIFICATION forming part of Letters Patent No. 526,923, dated October 2, 1894.

Application filed January 20, 1894. Serial No. 497,492. (No model.)

*To all whom it may concern:*

Be it known that I, HENRY ILIOWIZI, a citizen of the United States, residing in the city and county of Philadelphia, State of Pennsylvania, have invented a new and useful Improvement in Air Moistening and Purifying Attachments for Hot-Air Registers, which improvement is fully set forth in the following specification and accompanying drawings.

My invention consists of an attachment for a register as hereinafter described and claimed, whereby hot air from the latter may be divested of dust and moistened and modified, in which improved condition it may be directed into the apartment.

Figure 1 represents a perspective view of an attachment to a register embodying my invention. Fig. 2 represents a vertical section on line $x$, $x$, Fig. 1. Fig. 3 represents a vertical section on line $y$, $y$, Fig. 1.

Similar letters of reference indicate corresponding parts in the several figures.

Referring to the drawings: A designates a casing or frame which is adapted to be placed in front of a hot air register B, and communicates with the same. In the lower portion of the frame is a pan, tray or trough C for holding water, the front D of the same constituting a door which is a continuation of the upper part E of said frame, forming together a closed front for the casing. The sides F of the frame are provided with openings throughout their entire length and constitute the means for the exit of the purified and modified air from said frame, a space existing between the ends of the water receptacle C and each of the sides F of the frame A when the parts are in operative position, as is shown in Fig. 3, whereby the egress of the heated air is greatly facilitated.

It will be noted that by providing the sides alone of the casing with openings, all the impurities contained in the hot air are deflected downwardly into the pan before said air can be discharged from the casing.

Within the frame above the pan C, is a fan or fan-wheel G, which is mounted freely in position, so as to rotate by the passage of heat into the frame from the register.

In order to connect the frame with the register, I employ catches or hooks H, which are located within the frame, and have their heads hooked-on or engaged with the walls of the openings of the register, and their threaded ends passed through the wall of the part E of the frame, and engaged by nuts J, it being evident that when said nuts are tightened, the frame is drawn firmly against the register, and reliably connected therewith.

It will be seen that when the heated air enters the frame, it impacts against the wheel E, and rotates the latter, whereby the air is driven downwardly into the pan C against the surface of the water therein, so that dust, &c., is trapped by the water and the air thus purified is subjected to the vapor thereof, in which purified and moistened condition, it is directed to the open sides of the frame, and thus injected into the apartment.

The pan may be removed in order to readily pour out the water and dirt and be replenished with fresh water, without necessitating the disconnecting of brackets, hooks, bolts, or similar supporting devices, said pan resting on the bottom of the casing A and having its rear side preferably in contact with the register B.

If desired, disinfectant, deodorant or other material may be placed in the pan, the effect of which is evident.

I am aware that it has heretofore been proposed to inclose a water receptacle and a revolving fan in a suitable casing, and to attach the latter to a hot air register, and to such general construction I make no claim, my design in the present application being to simplify and render more accessible in various details, the principle operative parts of hot air registers constructed in accordance with the above principle.

Having thus described my invention, what I claim as new, and desire to secure by Letters Patent, is—

1. An air moistening and purifying attachment for a hot air register, consisting of a casing, having an imperforate upper front portion, in which is suitably journaled a fan, and a pan in the lower portion of said casing, the sides of the casing having openings throughout substantially their entire length, whereby the egress of the hot air is greatly facilitated, substantially as described.

2. An air moistening and purifying attachment for a hot air register, consisting of a casing, a water receptacle in the lower portion thereof, and a fan above the same adapted to be subjected to the hot air from the register, the side walls of said casing having openings throughout their entire length, a space being provided between said side walls and the ends of the water receptacle, whereby the egress of the hot air is greatly facilitated, substantially as described.

3. A casing closed at the top portion, and open at its lower front portion, the side walls of said casing being provided with openings throughout their entire length, a fan in the top portion, and a pan in the lower portion of said casing, the front D of said pan forming a continuation of the upper part of the casing, and serving as a door, whereby the removal of said pan alone, permits of access to the interior of the device, the above parts being combined substantially as described.

4. An air moistening and purifying attachment for a hot air register, consisting of a casing, a fan mounted in the upper part thereof, said casing having a closed front, and openings in its sides, a removable pan filling the lower part of said casing below said fan and having its front wall, forming a continuation of the wall of the casing, and means substantially as described for securing the latter to the wall of a register, said parts being combined substantially as described.

HENRY ILIOWIZI.

Witnesses:
ISAAC L. MARKS,
JOHN A. WIEDERSHEIM.